(12) United States Patent
Zaluska et al.

(10) Patent No.: US 6,251,349 B1
(45) Date of Patent: Jun. 26, 2001

(54) METHOD OF FABRICATION OF COMPLEX ALKALI METAL HYDRIDES

(75) Inventors: Alicja Zaluska; Leszek Zaluski; John Olaf Ström-Olsen, all of Montreal (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 09/544,977

(22) Filed: Apr. 7, 2000

Related U.S. Application Data

(63) Continuation of application No. PCT/CA98/00927, filed on Sep. 30, 1998.

(30) Foreign Application Priority Data

Oct. 10, 1997 (CA) .................................................. 2218271

(51) Int. Cl.$^7$ ................................ C01B 3/04; C01B 6/04; C01B 6/21; C01B 6/24
(52) U.S. Cl. ....................... 423/286; 423/644; 423/645; 423/646; 423/648.1; 423/658.2
(58) Field of Search .................................... 423/644, 645, 423/646, 648.1, 658.2, 286

(56) References Cited

U.S. PATENT DOCUMENTS

| | | | |
|---|---|---|---|
| 6,080,381 | * 6/2000 | Zaluska et al. | 423/648.1 |
| 6,106,801 | * 8/2000 | Bogdanovic et al. | 423/648.1 |

FOREIGN PATENT DOCUMENTS

| | | |
|---|---|---|
| 19526434 | 1/1997 | (DE) . |
| 2067844 | 8/1971 | (FR) . |

OTHER PUBLICATIONS

Chemical Abstracts, vol. 119, No. 22, Nov.29, 1993, Columbus, Ohio, US, abstract No. 240428, Dymova, T.N. et al: "Solid–phase Reaction of Crystalline Aluminum Trihydride. Formation of Alkali Metal Tetra– and Hexahydroaluminates", XP002089013, see abstract & Koord. Khim. (1993), 19(7), 529–34, Coden: KOKHDC; ISSN: 0132–344X, 1993.

Bogdanovic B et al: "Ti–doped Alkali Metal Aluminum Hydrides as Potential Novel Reversible Hydrogen Storage Materials", Journal of Alloys and Compounds, vol. 253–254, May 20,1997, pp. 1–9, XP004126498, see the whole document IDEM.

Claudy , Pierre et al: "Reactions of Lithium and Sodium Aluminum Hydride With Sodium or Lithium Hydride. Preparation of a New Alumino–Hydride of Lithium and Sodium (LiNa2A1H6)", Mater, Res. Bull. (1982), 17(12), 1499–504, CODEN: MRBUAC; ISSN: 0025–5408, 1982, XP002089012, see the whole document, IDEM.

* cited by examiner

Primary Examiner—Wayne Langel
(74) Attorney, Agent, or Firm—Swabey Ogilvy Renault

(57) ABSTRACT

Novel hydrides are produced by mechanically alloying at least two different hydrides, preferably at least one simple alkali metal hydride and at least one complex alkali metal hydride such as an alkali metal aluminum hydride; the method of production is simple and can be carried out at room temperature; the novel hydrides are useful as a source of hydrogen and have the particular advantage that after liberation of the hydrogen, the hydride is readily regenerated from the dehydrogenated hydride.

20 Claims, 5 Drawing Sheets

METHOD OF FABRICATION OF COMPLEX ALKALI METAL HYDRIDES

CROSS REFERENCE TO RELATED APPLICATION

This application is a continuation of PCT/CA98/00927 filed Sep. 30, 1998, in which the United States of America was designated and elected, and which remains pending in the International Phase until Apr. 10, 2000.

TECHNICAL FIELD

This invention relates to a method of producing a complex hydride; the invention also relates to novel complex hydrides; still further the invention relates to a method of providing a source of hydrogen.

BACKGROUND ART

Alkali metals (lithium, sodium and potassium) form a large variety of hydrides: simple hydrides (LiH, NaH, KH) and complex hydrides with other elements, for example, boron or aluminum. Many of these compounds are commonly used in various processes of organic chemistry, acting as reducing agents.

Because of the high reactivity of alkali metals, simple hydrides of Li, Na and K are produced in a direct reaction between molten alkali metal and hydrogen at very high pressures and temperatures. For complex hydrides, in each case a special process of fabrication has been developed.

Lithium aluminum hydride ($LiAlH_4$) was discovered about four decades ago [1] and since then it has become the most common reducing agent in many chemical reactions. Sodium aluminum hydride ($NaAlH_4$) was first synthesized in the early sixties [2], but it has never been used as widely, because of its more difficult fabrication as compared with $LiAlH_4$. Another complex hydride: sodium boron hydride ($NaBH_4$) [3] is also known as having good reduction ability in many organo-chemical reactions [4].

In the search for even better reducing agents, many other complex hydrides based on lithium, sodium or potassium have been synthesized as, for example, $LiBH_4$, $LiAl_4H_{13}$, $LiAl_2H_7$, $Li_3AlH_6$, $KAlH_4$, $KBH_4$, $K(Al(BH_4)_4)$.

In all cases the synthesis of these complex hydrides is performed through a chemical reaction under special conditions. For example, commercial fabrication of $LiAlH_4$ involves the reaction of LiH with $AlCl_3$ in diethyl ether [5]. In the early sixties Ashby and co-workers developed an alternative route of production of complex metal hydrides by direct synthesis [2, 6, 7]. This method can be applied to the production of $LiAlH_4$, $NaAlH_4$, $KAlH_4$ and $CsAlH_4$. According to Ashby, synthesis of, for instance, $NaAlH_4$ can be performed in the following way: "one charges either the alkali metal or its hydride to an autoclave with activated aluminum powder in a solvent such as tetrahydrofuran. The mixture then is subjected to a pressure of 2000 p.s.i. (about 140 bar) with hydrogen and heated to 150° C. for several hours. After the absorption is complete the mixture is cooled and the complex aluminum hydride is separated from excess of aluminum by filtration. $NaAlH_4$ can be isolated by addition of a hydrocarbon such as toluene to the tetrahydrofuran solution, followed by vacuum distillation of the tetrahydrofuran" [2].

Another complex alkali metal hydride, $Na_3AlH_6$, was primarily fabricated by Zakharin et al [8] in the reaction of NaH and $NaAlH_4$ at 160° C. in heptane. However, due to insolubility of the product in all solvents tested, it could not be purified. In response to the drawbacks of the above method Ashby et al proposed again a direct method for the synthesis of $Na_3AlH_6$ hydride [2, 7]. According to the direct method, $Na_3AlH_6$ can be synthesized by the following reaction:

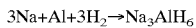

This reaction should be performed in toluene at 165° C. and at 5000 p.s.i. (about 350 bar) of hydrogen pressure.

Synthesis of $Li_3AlH_6$ was first discovered by Ehrlich et al [9,10]. Later on, Mayet and co-workers [11, 12, 13, 14] developed another method of fabrication of $Li_3AlH_6$, which provided better reproducibility and higher purity of the hydride. In this method a solution of $LiAlH_4$ in ether is added drop by drop into a suspension of LiH in toluene heated up to the temperature of 50° C. The mixture is kept for several hours at 50° C. to eliminate ether and is subsequently heated up to 95° C. to complete the reaction. Hot catalyst: $Al(C_2H_5)_3$ in toluene or etherate of triethylaluminum, is added during the first step of the process.

All the above methods for the production of complex alkali metal hydrides suffer from many drawbacks, i.e. the need to use solvents or dispersing liquids (hydrocarbons) with activators, multi-step character and relatively poor yield and reproducibility.

In order to overcome these problems, another method of fabrication of complex alkali metal hydrides was developed more recently by Dymova and co-workers [15, 16, 17, 18]. In this method the solvents were eliminated, but instead a reaction at a temperature above the melting point of the alkali metal was proposed. The reaction of molten alkali metals (Li, Na, K, Cs) with aluminum was performed at a temperatures of 200–400° C. and at hydrogen pressure of 100–400 bar.

In conclusion, all the previous methods of fabrication of complex alkali metal hydrides have three main disadvantages:

i) inconvenience of the use of toxic and flammable solvents such as toluene and tetrahydrofuran;

ii) very high hydrogen pressures (100–400 bar); and iii) high temperatures (100° C.–400° C.).

Alkali-metal-based complex hydrides were developed with a clear purpose to serve as reducing agents in chemical reactions, mainly in organic chemistry. However, other applications of these hydrides have also been considered. Most of these hydrides undergo decomposition at high temperatures. The decomposition releases hydrogen and therefore alkali-metal-hydrides can be used in some cases as an immediate source of hydrogen [19]. For example, $LiAlH_4$ decomposes when heated up to a temperature of 125° C. and releases gaseous hydrogen. This phenomenon has been exploited in equipment for hydrogen storage. It should be stressed however that these applications use alkali metal hydrides for a single, irreversible hydrogen release. There is no way to reverse the dehydrogenation reaction in these prior systems, without repeating the whole chemical procedure used in the production of the hydride, which obviously cannot be accomplished inside the hydrogen storage tank.

The present invention seeks to develop materials which can be used as a reversible source of hydrogen, i.e., which can be reversibly hydrided and dehydrided in subsequent cycles of hydrogen admission and evacuation, without any other treatment. The only prior method of yielding reversibility of hydrogenation in alkali-metal-based hydrides was reported in a recently published paper of Bogdanovic and Schwickardi [20]. The authors studied traditional alkali metal aluminum hydrides ($NaAlH_4$ and $Na_3AlH_4$) and state that "the reverse reaction has not been accomplished" until their method of doping with special Ti-based catalysts was developed [21]. The authors fabricated alkali metal hydrides in a conventional way (following the process described by Zakharin [8]). For example, $Na_3AlH$ was prepared from $NaAlH_4$ and NaH in heptane under hydrogen. The suspended reagents were intensively stirred at 162° C. for 72 h under a hydrogen pressure of 140 bar. The reversible hydrogenation was achieved when the materials were treated with 2 mol % of $\beta$-$TiCl_3$% in ether or with 3 mol % $Ti(OBu)_4$ in ether.

Although the results showed significant improvement of the hydride performance as compared to the undoped materials, the authors indicate that the kinetics of the process were still unsatisfactorily slow (for example, one absorption cycle took five to twenty or even 100 hours) and suffered from cyclic instability.

DISCLOSURE OF THE INVENTION

In the present invention a totally different method of fabrication of complex alkali metal hydrides has been developed which is based on a mechano-chemical reaction. The resulting hydrides exhibit outstanding, reversible hydrogenation properties, which remarkably surpass any previously reported performance.

In accordance with one aspect of the invention there is provided a method of producing a complex hydride comprising: mechanically alloying a first particulate hydride material with a second particulate hydride material, said first and second particulate hydride materials each being selected from the group consisting of alkali metal hydrides, alkali metal borohydrides, alkali metal aluminum hydrides and mixtures thereof, said first and second particulate hydride materials being different.

In accordance with the invention complex alkali-metal hydrides are fabricated in a solid-state reaction, i.e., a mechano-chemical reaction or mechanical alloying. Instead of using ion-carriers necessary for the chemical reaction to proceed (in the form of solvent or activators), and instead of applying high hydrogen pressures, a physical contact between the reagents is provided by means of mechanical treatment in the course of the reaction or alloying, which is the essence of the process.

Mechanical treatment during the reaction provides enhanced local reactivity of the reagents, by means of the continuous creation of fresh surfaces unaffected by oxides and hydroxides, and introduces local stress and deformation which is believed to enhance the rate of reaction. The method is performed on dry powders of the components (being not in the form of a slurry and without any solvents or additions). The method does not require high hydrogen pressures or elevated temperatures and can be performed under inert gas atmosphere or a hydrogen gas atmosphere, at normal pressure and at room temperature (20° C.). Also, no special catalyst, reaction agents or other activators are required. The method can be easily accomplished by grinding, agitating or ball milling of the appropriate reagents, and this can be carried out at a wide range of impact energies and grinding, agitating or milling times. The method may be carried out in the absence of a solvent.

In another aspect of the invention there is provided novel complex hydrides which function as a recyclable store of hydrogen. In the present invention the novel complex hydrides include hydrides which are a novel combination of elements as well as hydrides of known chemical composition but which have a novel physical structure.

In a further aspect of the invention there is provided a method of providing a source of hydrogen gas comprising: liberating hydrogen from a complex alkali metal hydride derived from the mechanical alloying of at least two different hydrides of alkali metals, with formation of a supply of hydrogen gas and a dehydrogenated form of the complex hydride, removing the liberated hydrogen, and regenerating the complex hydride as a future source of hydrogen by exposing the dehydrogenated form to hydrogen gas and absorbing the hydrogen gas in the dehydrogenated form.

DESCRIPTION OF PREFERRED EMBODIMENTS i) Hydrides

The mechano-chemical method of the invention for the production of complex alkali metal hydrides is universal to such an extent that it can be effectively applied to almost any required composition of the complex hydride. Therefore the method is not limited to the production of known complex hydrides, but can be also used to develop new complex hydrides with new hydrogenation properties.

Complex hydrides in the context of the present invention contemplates hydride compounds containing at least two different metals, at least one of which is an alkali metal.

In especially preferred embodiments the first particulate hydride material comprises at least one hydride selected from the group consisting of alkali metal hydrides (LiH, NaH, KH) and alkali metal borohydrides ($LiBH_4$, $NaBH_4$, $KBH_4$) and the second particulate hydride material comprises at least one alkali metal aluminum hydride ($LiAlH_4$, $NaAlH_4$, $KAlH_4$).

The first and second particulate hydride materials suitably have a particle size of less than 100 $\mu$m.

By varying the proportions of the first and second hydride materials and the composition of the respective materials, a wide variety of different complex hydrides are readily formed.

Suitably the molar ratio of the first hydride material to the second hydride material is 5:1 to 1:5 and preferably 3:1 to 1:2.

In a particular embodiment, fabrication of the complex alkali-metal based hydrides comprises mixing powders of simple hydrides (LiH, NaH, KH) with other hydride complexes (e.g. $AlH_3$) or other alkali metal hydrides ($LiAlH_4$, $LiBH_4$, $NaAlH_4$, $NaBH_4$, $KAlH_4$, $KBH_4$ etc.) in a desired proportion and applying mechanical treatment at high impact energy, for example, by grinding, agitating or ball milling, in an inert atmosphere, for instance of argon or a hydrogen atmosphere. The fabrication can be carried out at a temperature below 100° C. and in particular proceeds efficiently at room temperature (20° C.).

By way of example the powders may be ball milled in a high energy ball mill such as that available under the Trade-mark SPEX 8000 or Model SP2100 (from SCP. Science of St-Laurent, Quebec). These ball mills typically employ steel balls or tungsten carbide balls. Suitable operating parameters include a weight ratio of mill balls to hydrides of 30:1 to 2:1 and a milling time of 0.25 to 20 hours, more usually 2 to 5 hours, however, a wide range of grinding, agitating or ball milling conditions can be employed to effect the desired mechanical alloying.

Production of, for example, $Li_3AlH_6$ or $Na_3AlH_6$ can be easily and effectively performed according to the reactions previously used in other methods, but employing the simpler method of the invention:

$$2NaH + NaAlH_4 \rightarrow Na_3AlH_6$$

$$2LiH + LiAlH_4 \rightarrow Li_3AlH_6$$

Other new complex hydrides can be produced by the substitution of certain alkali hydride complexes by others in the initial mixture of hydrides. This leads to the formation of complex hydrides which have not been synthesized until now, due to the limitations of the chemical methods. In the present invention a great number of such complex hydrides have been synthesized, being a combination of simple hydride complexes, for example:

$$NaH + LiH + LiAlH_4 \rightarrow NaLi_2AlH_6$$

$$NaBH_4 + NaAlH_4 \rightarrow Na_2BAlH_6$$

$$LiH + NaH + NaAlH_4 \rightarrow Na_2LiAlH_6$$

In the case of the above and analogous reactions (which have not been previously established by chemical methods) the reaction routes are still not fully determined and are under investigation. Results demonstrate that these reactions often take place with formation of new, unknown crystallographic structures. More importantly, these new phases exhibit new hydrogenation performance, which leads to reversibility of hydrogen storage in alkaline metal hydrides.

The novel hydrides of the invention are useful as reducing agents, the method of the invention providing a simpler procedure than heretofore available for the production of such reducing agents. The hydrides of the invention are also useful as a recyclable store of hydrogen. After liberating the hydrogen from the hydrides of the invention with formation of a dehydrogenated form of the hydride, the hydride is readily regenerated on exposure of the dehydrogenated form to hydrogen.

In a particular embodiment of the invention there is provided a complex particulate hydride produced by mechanical alloying of at least two different hydrides and which is characterized as a recyclable store of hydrogen which liberates hydrogen at an elevated temperature within 60 minutes, and having a dehydrogenated state which absorbs hydrogen within 60 minutes.

In a further particular embodiment of the invention there is provided the dehydrogenated form of the complex hydride of the invention characterized by an ability to absorb hydrogen gas with generation of said hydride.

ii) Reversible Hydrogenation

Complex alkali metal hydrides fabricated by the mechano-chemical process exhibit unique properties in terms of reactivity in hydriding/dehydriding reactions. No other alkali metal hydrides undergo reversible cycles of hydrogenation/dehydrogenation under gaseous hydrogen at medium pressures (20–50 bars), when being in the solid powder form, with no solvents, catalysts or activators. Excellent hydrogenation/dehydrogenation cyclability occurs in the novel complex hydrides synthesized in this invention. Results show that reversibility of hydrogenation in, for example, $Na_3AlH_6$, produced by mechano-chemical reaction, occurs with fast kinetics, even without any catalytic treatment. Reaction rates are significantly faster or similar to these presented in ref. [20] for hydrides treated by the special Ti-doping method [21]. Moreover, reversible hydrogen capacities are much higher than these reported in [20].

Newly designed and fabricated complex alkali metal hydrides (consisting of either novel forms of previously known compositions or of new compositions) represent a whole spectrum of materials with controllable hydrogenation properties. It has been established that, in some cases, lithium-based complexes decrease plateau pressures. Therefore in order to design materials with lower operational hydrogen pressures more lithium complexes are introduced in the course of the mechano-chemical reaction into the structure of the complex hydride as, for example, in $Li_2NaAlH_6$. On the other hand, boron-based complexes can increase the plateau pressure in some complex hydrides and therefore boron-based complexes are advantageous in the hydride to allow lower operational temperatures, if this is required (e.g. $Na_2BAlH_6$). Reversible hydrogen capacity is obviously dependent on the relative ratios of alkali metals (Li, Na, K) and other elements (aluminum, boron) in the complex hydride. Therefore mechano-chemical reactions permit design of an optimum composition of the complex alkali metal hydrides depending on the required operational conditions for reversible hydrogen storage (hydrogen pressure, temperature, hydrogen capacity).

EXAMPLES

Example 1

Fabrication of $Li_3AlH_6$ and $Na_3AlH_6$ was performed by mechanical alloying of the respective amounts of LiH and $LiAlH_4$ to produce $Li_3AlH_6$ and of NaH and $NaAlH_4$ to produce $Na_3AlH_6$ in a stainless-steel vial with stainless-steel balls. The reaction took place at room temperature under argon atmosphere, with no solvents, catalysts or activators. In each case the mixture of hydrides was ball milled in a commercial ball mill SPEX 8000 (Trade-mark) having stainless steel balls at a weight ratio of balls to hydrides of 16:1, and a milling time of 3 hours at 20° C.

Formation of $Li_3AlH_6$ and $Na_3AlH_6$ was confirmed by x-ray diffraction and also by differential scanning calorimetry (DSC).

Figure 1:
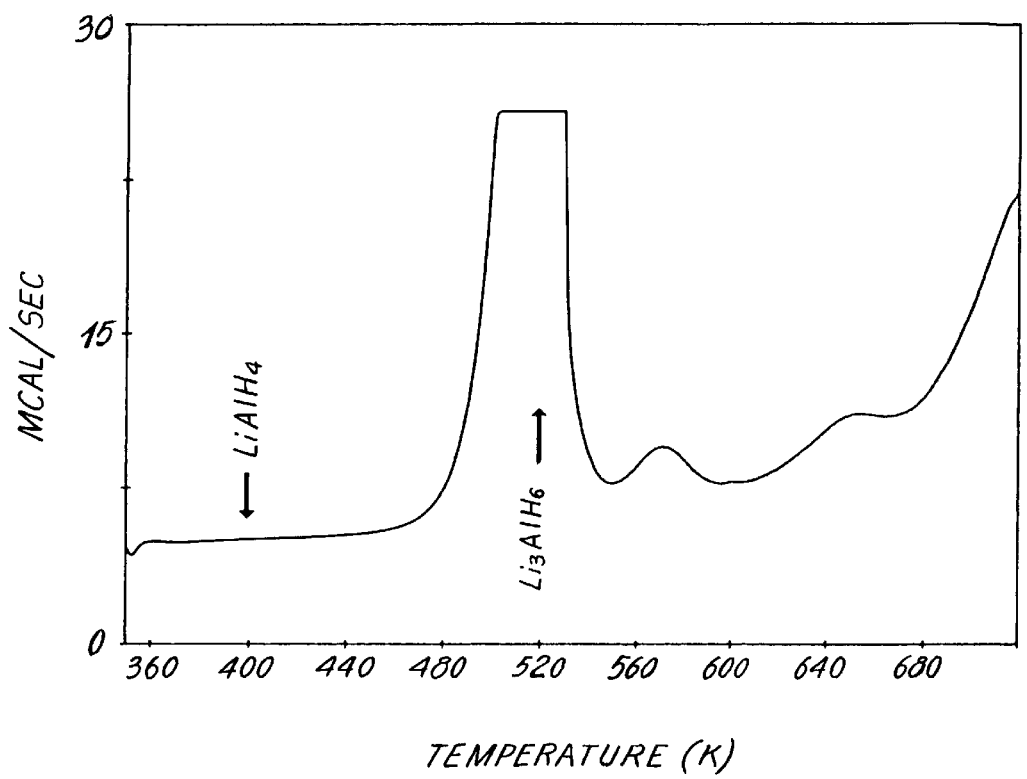
FIG. 1 is a DSC scan of a hydride of the invention corresponding to $Li_3AlH_6$.

FIG. 1 shows a DSC scan at a scan rate of 20 deg./min. of the mechanically treated mixture of $2LiH + LiAlH_4$. Instead of the endothermic peak of the decomposition of $LiAlH_4$ occurring at 125° C. (398 K) a large endothermic effect was observed at the temperature characteristic for $Li_3AlH_6$, which is 240° C.–260° C. according to Ref. [11] (decomposition of LiH is beyond the registered temperature range).

Figure 2:
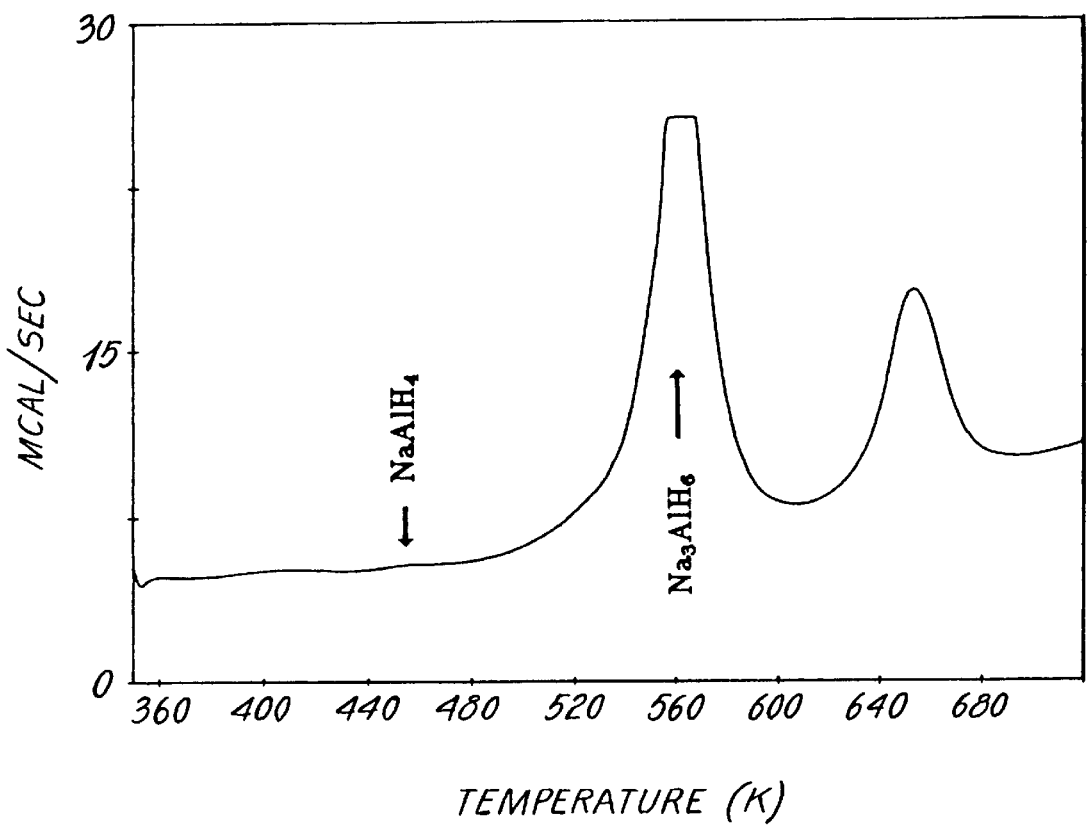
FIG. 2 is a DSC scan of a hydride of the invention corresponding to $Na_3AlH_6$.

FIG. 2 presents a DSC curve at a scan rate of 20 deg./min. for a mechanically alloyed mixture of $2NaH + NaAlH_4$, and again there is no endothermic effect of the decomposition of $NaAlH_4$ (which occurs at 185° C., i.e., 458 K), but instead an endothermic reaction at higher temperature is observed, characteristic for the decomposition of $Na_3AlH_6$ (i.e. 280° C. (553 K) [2]). Additional proof of the mechano-chemical reaction is the second peak seen in the DSC scan of FIG. 2. This endothermic effect can be attributed to the decomposition of NaH. However, the temperature of the peak is significantly shifted (as compared to the decomposition of pure NaH) which indicates that in this case NaH was a product of the previous decomposition of $Na_3AlH_6$, which occurred within the first endothermic effect.

Example 2

Figure 3:
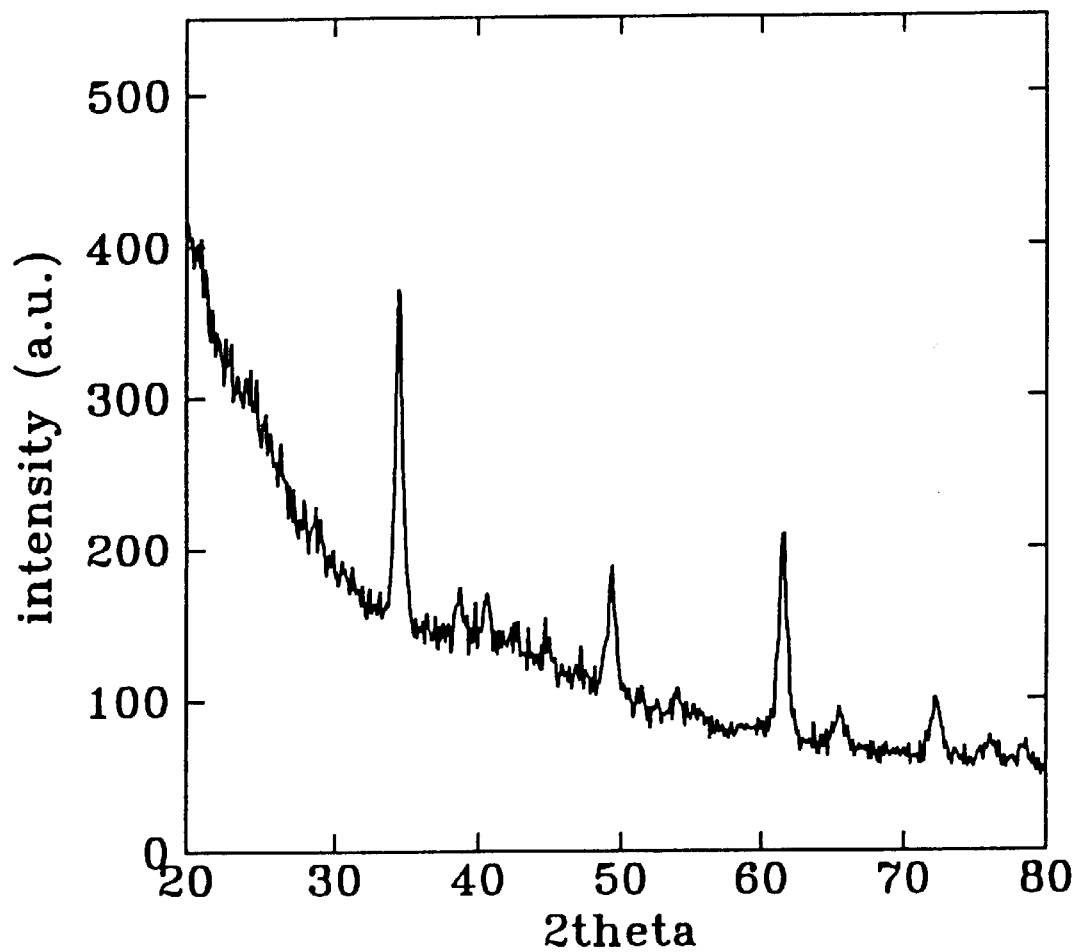
FIG. 3 is an X-ray diffraction pattern of a hydride formed by mechanically alloying LiH, NaH, $LiAlH_4$ and $NaAlH_4$, in accordance with the invention.

New hydride structures have been formed after mechano-chemical reaction of the appropriate mixtures consisting of the following hydrides in various proportions: NiH, NaH, $LiAlH_4$, $NaAlH_4$, $NaBH_4$, $KAl_4$, $LiB_4$, etc. The results demonstrate that the mechanical alloying method of the invention has wide applicability in the production of hydrides. FIG. 3 shows the x-ray diffraction pattern of a new, simple structure of the hydride formed as a result of mechano-chemical reaction involving four components: LiH, NaH, $LiAlH_4$ and $NaAlH_4$. Instead of the diffraction reflections characteristic for the mixture of the components or other known complex hydrides, a single phase with simple bcc structure was observed. The milling conditions were the same as for Example 1.

Example 3

Figure 4:
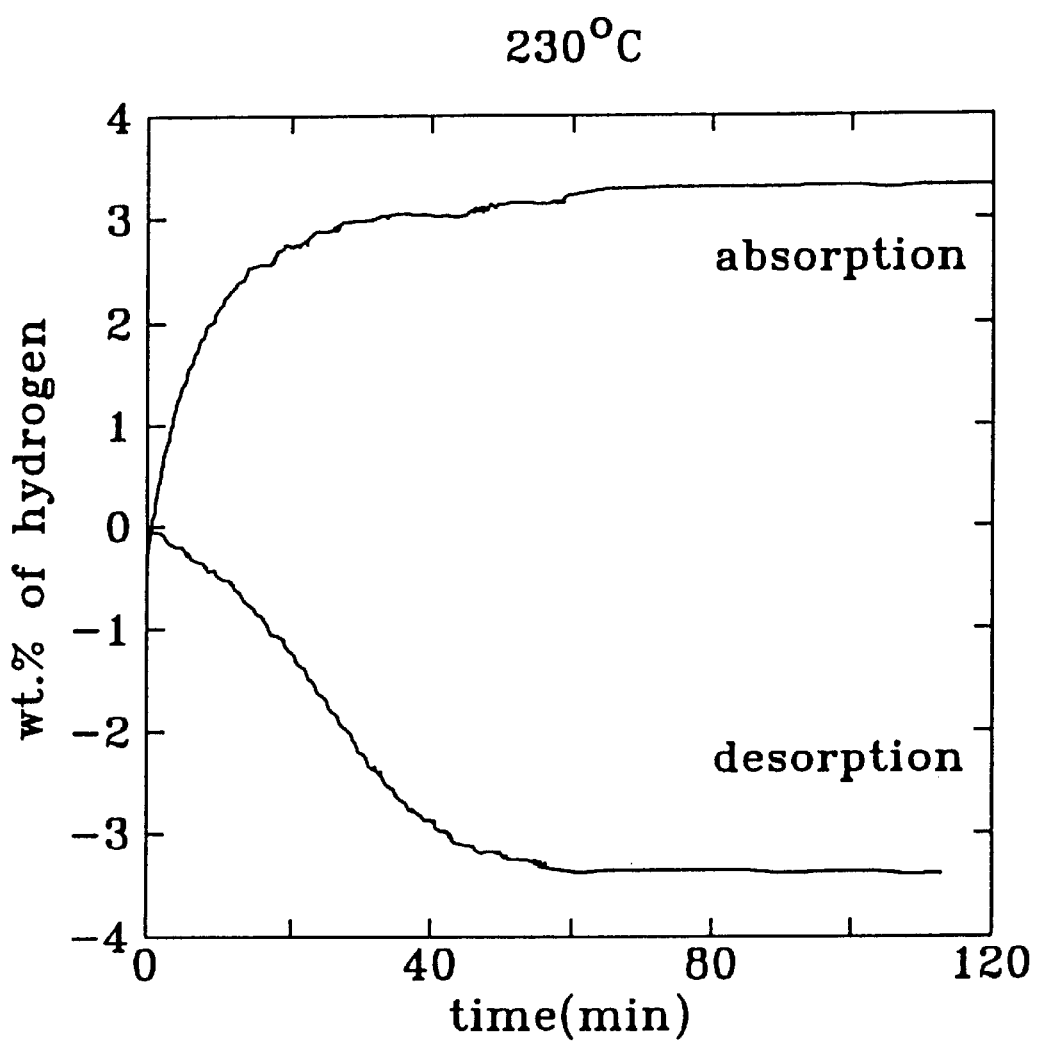
FIG. 4 shows the hydrogen desorption of the hydride of Example 2 and FIG. 3, and hydrogen absorption of the dehydrogenated form of the hydride with time, at 230° C.

The hydride of Example 2 and FIG. 3 fabricated by mechanical alloying, exhibits reversible hydriding/dehydriding behavior as a result of the reaction with gaseous hydrogen in a hydrogen storage container. After fabrication, the powders were placed in a reaction chamber of a gas titration system. Hydrogen absorption and desorption was measured as a result of the pressure change of hydrogen in the chamber. As seen in FIG. 4, absorption of about 3 wt. % of hydrogen occurred at 230° C. within about 30 min. and desorption within 40 min. Cycles of absorption and desorption were repeated by cyclic admission and evacuation of hydrogen.

Example 4

Figure 5:
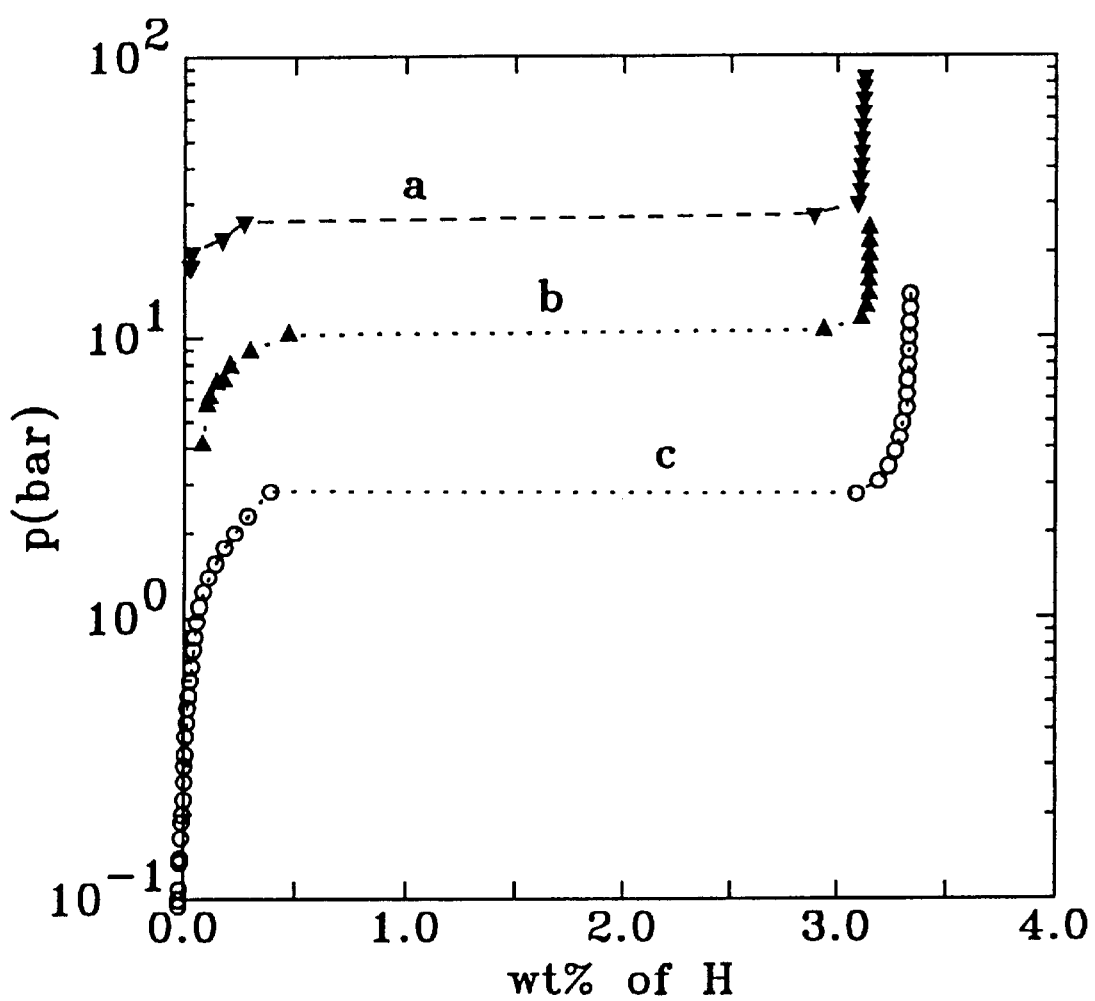
FIG. 5 is a plot of pressure-composition-isotherms for three hydrides produced by the method of the invention.

Materials prepared by mechano-chemical reaction exhibit different thermodynamic properties (equilibrium pressure) in dependence on the initial composition of the mixture of hydrides. As a result, operational conditions of hydrogenation/dehydrogenation cycles can be adjusted by changes of the material composition. FIG. 5 shows pressure-composition-isotherms (taken at 220° C.) for three different hydrides.

(a) —$Na_3AlH_6$ (b) —$Na_{1.8}Li_{0.6}B_{0.6}AlH_6$ (c) —$Li_{1.8}Na_{1.2}AlH_6$.

Hydride (a) is the hydride of FIG. 2, in Example 1.

References

[1] H. Schlesinger and H. Brown, U.S. Pat. No. 2,461,661, 1949.
[2] E. C. Ashby and P. Kobetz, Inorg. Chem., Vol. 5, No. 9, p. 1616, 1963.
[3] H. Schlesinger and H. Brown, U.S. Pat. No. 2,534,533, 1950.
[4] J. Osby, S. W. Heinzman and B. Ganem, J. Am. Chem. Soc., Vol. 108.No. 1, p. 67, 1986
[5] A. E. Finholt, A. C. Bond and H. Schlesinger, J. Am. Chem. Soc., Vol. 69, p. 1199, 1947.
[6] E. C. Ashby, G. J. Brendel and H. Redman, Inorg. Chem., Vol.2, p. 449, 1963.
[7] E. C. Ashby, French Pat. No. 1,235,680, 1960.
[8] L. Zakharin and V. Gavrilenko, Dokl. Akad. Nauk SSSR, Vol. 1, No. 145,p. 793,1962.
[9] R. Ehrlich, A. Young, G. Rice, J. Dvorak, P. Shapiro and H. F. Smith, J. Amer. Chem. Soc., Vol.88, No.4, p. 858, 1996.
[10] J. J. Dvorak and R. Ehrling, U.S. Pat. No. 3,357,806, 1967.
[11] J. Mayet, S. Kovacevic and J. Tranchant, Bull. Soc. Chim. Fr., Vol. 22,p. 504,1973.
[12] J. Mayet, S. Kovacevic and J. Tranchant, Bull. Soc. Chim. Fr., Vol 2, p. 506, 1973.
[13] J. Tranchant and J. Mayet, French Pat. No. 7020279, 1970.
[14] J. Tranchant and J. Mayet, French Pat. No. 6914185, 1969.
[15] T. N. Dymova, N. G. Eliseeva, S. Bakum and Y. M. Dergachey, Dokl Nauk SSSR, Vol.215,p. 1369, 1974.
[16] T. N. Dymova, Y. M. Dergachev, V. A. Sokolov and N. A. Grechanaya, Dokl. Akad. Nauk SSR, Vol 224,No. 3, P. 591, 1975.
[17] T. N. Dymova, Russ. Pat. No. 265868, 1968.
[18] T. N. Dymova, S. I. Bakum and V. M. Bakulina, Russ. Pat. No. 223788, 1967.
[19] C. Ward, D. Stanga, L. Pataki and R. Venter, J. Power Sources, Vol. 41,p. 335, 1993.
[20] B. Bogdanovic and M. Schwickardi, J. Alloys and Comp., Vol. 253, p. 1, 1997.
[21] B. Bogdanovic, German Pat. Appln. No. 195 26 434.7, 1995.

We claim:

1. A method of producing a complex hydride comprising: mechanically alloying a first particulate hydride material with a second particulate hydride material, said first and second particulate hydride materials each being selected from the group consisting of alkali metal hydrides, alkali metal borohydrides, alkali metal aluminum hydrides and mixtures thereof, said first and second particulate hydride materials being different, and recovering a resultant complex hydride derived from said first and second hydride materials, said resultant complex hydride being different from said first and second hydride materials.

2. A method according to claim 1, wherein the mechanical alloying is carried out in an inert atmosphere.

3. A method according to claim 1, wherein the mechanical alloying is carried out in an atmosphere of hydrogen.

4. A method according to claim 1, wherein the mechanical alloying is carried out at a temperature below 100° C. in the absence of a solvent.

5. A method according to claim 1, wherein said first particulate hydride material comprises at least one hydride selected from the group consisting of alkali metal hydrides and alkali metal borohydrides; and said second particulate hydride is an alkali metal aluminum hydride.

6. A method according to claim 1, wherein said first and second particulate hydride materials have a particle size of less than 100 $\mu$m.

7. A method according to claim 1, in which the molar ratio of the first hydride material to the second hydride material is 5:1 to 1:5.

8. A method according to claim 7, wherein said molar ratio is 3:1 to 1:2.

9. A method according to claim 1, wherein said alloying comprises ball milling said first and second particulate hydride materials at a weight ratio of mill balls to said particulate hydride materials of 30:1 to 2:1 for a time of 0.25 to 20 hours.

10. A hydride selected from the group consisting of $NaLi_2AlH_6$ and $Na_2BAlH_6$ and produced by the method of claim 1.

11. A hydride produced by the method of claim 1, in which said first and second materials comprise LiH, NaH, $LiAlH_4$ and $NaAlH_4$ and having an x-ray diffraction pattern as shown in FIG. 3.

12. A complex particulate hydride produced by mechanical alloying of at least two different hydrides in accordance with the method of claim 1, and which is characterized as a recyclable store of hydrogen which liberates hydrogen at an elevated temperature within 60 minutes and having dehydrogenated state which absorbs hydrogen within 60 minutes.

13. A hydride according to claim 12, wherein said at least two different hydrides are selected from the group consisting of alkali metal hydrides, alkali metal borohyrides, alkali metal aluminum hydrides and mixtures thereof.

14. A hydride according to claim 12, wherein said at least two different hydrides comprise a first particulate hydride material and a second particulate hydride material and said first particulate hydride material comprises at least one hydride selected from the group consisting of alkali metal hydrides and alkali metal borohydrides; and said second particulate hydride is an alkali metal aluminum hydride.

15. A dehydrogenated form of the complex particulate hydride defined in claim 12, characterized by an ability to absorb hydrogen gas with generation of said hydride.

16. A method of providing a source of hydrogen gas comprising:

liberating hydrogen from a complex alkali metal hydride derived from the mechanical alloying of at least two different hydrides of alkali metals, in accordance with the method of claim 1, with formation of a supply of hydrogen gas and a dehydrogenated form of said complex hydride, removing said liberated hydrogen, and regenerating said complex hydride as a future source of hydrogen by exposing said dehydrogenated form to hydrogen gas and absorbing said hydrogen in said dehydrogenated form.

17. A method according to claim 16, wherein said at least two different hydrides are selected from the group consisting of alkali metal hydrides, alkali metal borohydrides, alkali metal aluminum hydrides and mixtures thereof.

18. A method according to claim 16, wherein said at least two different hydrides comprise a first particulate hydride material and a second particulate hydride material and said first particulate hydride material comprises at least one hydride selected from the group consisting of alkali metal hydrides and alkali metal borohydrides; and said second particulate hydride is an alkali metal aluminum hydride.

19. A method according to claim 16, wherein said hydride is selected from $NaLi_2AlH_6$, $Na_2BAlH_6$ and $Na_2LiAlH_6$.

20. A method according to claim 16, wherein said hydride is selected from $NaLi_2AlH_6$ and $Na_2BAlH_6$.

* * * * *